US012052452B2

(12) United States Patent
Li et al.

(10) Patent No.: US 12,052,452 B2
(45) Date of Patent: Jul. 30, 2024

(54) METHOD AND APPARATUS FOR DISPLAYING VIDEO IMAGE, ELECTRONIC DEVICE AND STORAGE MEDIUM

(71) Applicant: JOYME PTE. LTD., Singapore (SG)

(72) Inventors: Yiwei Li, Singapore (SG); Beiyu Liu, Singapore (SG); Ce Chen, Singapore (SG); Xinglong Quan, Singapore (SG); Bao Mei, Singapore (SG)

(73) Assignees: JOYME PTE. LTD., Singapore (SG); Ce Chen, Singapore (SG)

( * ) Notice: Subject to any disclaimer, the term of this patent is extended or adjusted under 35 U.S.C. 154(b) by 229 days.

(21) Appl. No.: 17/640,022

(22) PCT Filed: Jun. 3, 2020

(86) PCT No.: PCT/CN2020/094206
§ 371 (c)(1),
(2) Date: Mar. 3, 2022

(87) PCT Pub. No.: WO2021/042783
PCT Pub. Date: Mar. 11, 2021

(65) Prior Publication Data
US 2022/0321928 A1 Oct. 6, 2022

(30) Foreign Application Priority Data
Sep. 6, 2019 (CN) .......................... 201910844461.X (51) Int. Cl.
*H04N 21/238* (2011.01)
*H04N 21/236* (2011.01)
(Continued)

(52) U.S. Cl.
CPC ..... *H04N 21/238* (2013.01); *H04N 21/23605* (2013.01); *H04N 21/2393* (2013.01); *H04N 21/2402* (2013.01)

(58) Field of Classification Search
CPC ....... H04N 21/2343; H04N 21/234309; H04N 21/234345; H04N 21/23605;
(Continued)

(56) References Cited

U.S. PATENT DOCUMENTS

| 8,095,954 B2 * | 1/2012 | Walker ................. H04N 21/482 725/47 |
| 9,900,653 B2 * | 2/2018 | Kitano ............. H04N 21/44227 |

(Continued)

FOREIGN PATENT DOCUMENTS

| CN | 101854286 A | 10/2010 |
| CN | 106101595 A | 11/2016 |

(Continued)

OTHER PUBLICATIONS

International Search Report / Written Opinion dated Aug. 7, 2020 in related/corresponding PCT Application No. PCT/CN2020/094206.

*Primary Examiner* — Michael B. Pierorazio
(74) *Attorney, Agent, or Firm* — PATENT PORTFOLIO BUILDERS PLLC (57) ABSTRACT

The embodiment of the present disclosure provides a method and an apparatus for displaying a video image, an electronic device and a storage medium. The solution is as follows: receiving, by a server, a UDP request sent by a client based on an IP address of the server, wherein the UDP request includes identification information of a video to be played; acquiring the video to be played according to the identification information of the video to be played; encapsulating the video to be played from a key frame of the video to obtain a UDP packet; and sending the UDP packet to the client at a first transmission rate, so that the client, after receiving the UDP packet, decapsulates the UDP packet to obtain the video to be played, and display a first image frame of the video to be played, wherein the first transmission rate is the maximum transmission rate determined according to (Continued)

a network bandwidth. According to technical solutions provided in the embodiments of the present disclosure, the time required from initiating the request to displaying the first image frame of the video is reduced, and a display speed of the first image frame of the video is improved.

13 Claims, 5 Drawing Sheets

(51) Int. Cl.
*H04N 21/239* (2011.01)
*H04N 21/24* (2011.01)

(58) Field of Classification Search
CPC ......... H04N 21/238; H04N 21/23805; H04N 21/2393; H04N 21/2402; H04N 21/26216; H04N 21/437; H04N 21/44008; H04N 21/4402; H04N 21/440218; H04N 21/440245; H04N 21/64322

See application file for complete search history.

(56) References Cited

U.S. PATENT DOCUMENTS

| | | | | |
|---|---|---|---|---|
| 10,523,890 B2* | 12/2019 | Gao | ................ | H04N 21/41407 |
| 11,223,870 B2* | 1/2022 | Gao | ................ | H04N 19/593 |
| 11,381,869 B2* | 7/2022 | Gao | ................ | H04N 21/234309 |
| 2002/0144267 A1* | 10/2002 | Gutta | ................ | H04N 21/4532 |
| | | | | 348/E5.104 |
| 2003/0009757 A1* | 1/2003 | Kikinis | ................ | H04N 21/25866 |
| | | | | 725/39 |
| 2003/0051246 A1* | 3/2003 | Wilder | ................ | H04N 7/17318 |
| | | | | 348/E7.071 |
| 2004/0060059 A1* | 3/2004 | Cohen | ................ | G08C 17/02 |
| | | | | 725/29 |
| 2005/0108751 A1* | 5/2005 | Dacosta | ................ | H04N 21/4135 |
| | | | | 348/E5.103 |
| 2006/0123455 A1* | 6/2006 | Pai | ................ | H04N 21/2668 |
| | | | | 348/E7.071 |
| 2007/0061840 A1* | 3/2007 | Walter | ................ | H04N 21/6582 |
| | | | | 725/50 |
| 2007/0061842 A1* | 3/2007 | Walter | ................ | H04N 21/47 |
| | | | | 725/39 |
| 2007/0136742 A1* | 6/2007 | Sparrell | ................ | H04N 21/84 |
| | | | | 348/E5.007 |
| 2008/0025693 A1* | 1/2008 | Lee | ................ | H04N 5/782 |
| | | | | 386/291 |
| 2008/0028318 A1* | 1/2008 | Shikuma | ................ | H04N 21/4751 |
| | | | | 715/744 |
| 2008/0109849 A1* | 5/2008 | Wang | ................ | H04N 21/485 |
| | | | | 725/46 |
| 2010/0115557 A1* | 5/2010 | Billmaier | ................ | G06F 16/435 |
| | | | | 707/E17.014 |
| 2010/0251304 A1* | 9/2010 | Donoghue | ................ | H04N 21/4755 |
| | | | | 725/46 |
| 2011/0023081 A1* | 1/2011 | Mornhineway | ................ | G08C 23/04 |
| | | | | 398/115 |
| 2011/0173665 A1* | 7/2011 | Shim | ................ | H04H 60/06 |
| | | | | 725/46 |
| 2011/0320482 A1* | 12/2011 | Barbieri | ................ | G06F 16/9535 |
| | | | | 707/769 |
| 2012/0074863 A1* | 3/2012 | Shimomura | ................ | H05B 45/37 |
| | | | | 315/246 |
| 2012/0151529 A1* | 6/2012 | Andersson | ................ | H04N 21/4788 |
| | | | | 725/44 |
| 2012/0159551 A1* | 6/2012 | Walter | ................ | H04N 21/482 |
| | | | | 725/45 |
| 2013/0326560 A1* | 12/2013 | Wang | ................ | H04N 21/4782 |
| | | | | 725/56 |
| 2015/0020088 A1* | 1/2015 | Velasco | ................ | H04L 12/2838 |
| | | | | 725/116 |
| 2016/0127771 A1* | 5/2016 | Pasqualino | ................ | H04N 19/65 |
| | | | | 348/474 |
| 2017/0149856 A1* | 5/2017 | Liu | ................ | H04N 21/43637 |
| 2019/0132148 A1* | 5/2019 | Kambhatla | ................ | H04N 21/434 |
| 2019/0354318 A1* | 11/2019 | Foo | ................ | G06F 13/287 |
| 2020/0068050 A1* | 2/2020 | Foo | ................ | G06F 9/30098 |
| 2021/0099773 A1* | 4/2021 | Bouazizi | ................ | H04N 21/2368 |
| 2022/0109908 A1* | 4/2022 | Chan | ................ | H04N 21/43635 |

FOREIGN PATENT DOCUMENTS

| | | |
|---|---|---|
| CN | 107483972 A | 12/2017 |
| CN | 107948762 A | 4/2018 |
| CN | 110557655 A | 12/2019 |
| WO | 2009019201 A2 | 2/2009 |

* cited by examiner

METHOD AND APPARATUS FOR DISPLAYING VIDEO IMAGE, ELECTRONIC DEVICE AND STORAGE MEDIUM

The present application is a U.S. National Stage of PCT/CN2020/094206 filed Jun. 3, 2020, which claims the priority of the Chinese patent application No. 201910844461.X, filed in China National Intellectual Property Administration on Sep. 6, 2019, and entitled "METHOD AND APPARATUS FOR DISPLAYING VIDEO IMAGE, ELECTRONIC DEVICE AND STORAGE MEDIUM", which is incorporated herein by reference in its entirety.

TECHNICAL FIELD

The present disclosure relates to the technical field of streaming video, and in particular, to a method and an apparatus for displaying a video image, an electronic device and a storage medium.

BACKGROUND

With continuous development of Internet technology, watching a live video using a client is becoming a common phenomenon. At present, when a user chooses to watch the live video by using the client, the client initiates a request using a complete video address with a domain name and determines a corresponding server by resolving the domain name in the request, and then a Transmission Control Protocol (TCP) connection between the server and the client is established via a three-way handshake. The server sends video data to the client in a slow-start manner. After receiving the video data sent by the server, the client displays a first image frame of the video data, to realize the playback of the live video.

During displaying of the first image frame of the video described above, since both a domain name resolution and a video data transmission by the server in the slow-start manner take a lot of time, it takes a long time for the client to receive the video data, which leads to a slow displaying of the first image frame of the video. That is, it takes a long time from initiating the request by the client to parsing to obtain the first frame of the video and displaying.

SUMMARY

The purpose of the embodiments of the present disclosure is to provide a method and an apparatus for displaying a video image, an electronic device and a storage medium, so as to shorten the display time of a first image frame of the video and improve the display speed of the first image frame of the video. The specific technical solutions are described as follows.

The embodiment of present disclosure provides a method for displaying a video image, which is applied to a server. The method includes:
  receiving a User Datagram Protocol (UDP) request which is sent by a client based on an Internet Protocol (IP) address of the server, wherein the UDP request includes identification information of a video to be played;
  acquiring the video to be played according to the identification information of the video to be played;
  encapsulating the video to be played from a key frame of the video to obtain a UDP packet; and
  sending the UDP packet to the client at a first transmission rate, so that the client, after receiving the UDP packet, decapsulates the UDP packet to obtain the video to be played, and displays a first image frame of the video to be played, wherein the first transmission rate is the maximum transmission rate determined according to a network bandwidth.

Optionally, a step of encapsulating the video to be played from a key frame of the video to obtain a UDP packet includes:
  detecting whether amount of data of the video to be played is greater than a preset data amount threshold;
  when the amount of data of the video to be played is greater than the preset data amount threshold, encapsulating the video to be played according to the key frame of the video included in the video to be played and the preset data amount threshold to obtain the UDP packet; and
  when the amount of data of the video to be played is not greater than the preset data amount threshold, encapsulating the video to be played from a first key frame of the video to obtain the UDP packet.

Optionally, the method further includes:
  detecting whether there is a congestion in the network during a course of sending the UDP packet to the client;
  when there is a congestion in the network during the course of sending the UDP packet to the client, adjusting a transmission rate at which the UDP packet is sent to the client by using a congestion control algorithm; and
  sending the UDP packet to the client at an adjusted transmission rate.

The embodiment of present disclosure also provides a method for displaying video image, which is applied to the client, and the method includes:
  sending a User Datagram Protocol (UDP) request to a server based on an Internet Protocol (IP) address of the server, wherein the UDP request includes identification information of a video to be played;
  receiving a UDP packet sent by the server, wherein the UDP packet is obtained by the server by acquiring the video to be played according to the identification information of the video to be played after receiving the UDP request, and encapsulating the video to be played from a key frame of the video;
  decapsulating the UDP packet to obtain the video to be played; and
  displaying a first image frame of the video to be played.

Optionally, a step of decapsulating the UDP packet to obtain the video to be played includes:
  unpacking the UDP packet according to a preset streaming format;
  detecting codec information included in the UDP packet unpacked; and
  decoding the UDP packet unpacked according to the codec information to obtain the video to be played.

Optionally, a step of detecting codec information included in the UDP packet unpacked includes:
  detecting whether the UDP packet unpacked includes the codec information according to a preset detection duration and preset detection data amount; and
  when the UDP packet unpacked includes the codec information, obtaining the codec information.

Optionally, the method further includes:
  detecting whether the UDP packet sent by the server is received within a preset duration after the UDP request is sent; and when the UDP packet sent by the server is not received within the preset duration after the UDP request is sent, resending the UDP request to the server based on the IP address of the server.

The embodiment of present disclosure further provides an apparatus for displaying a video image, which is applied to a server, and the apparatus includes:
a first receiving module, configured to receive a User Datagram Protocol (UDP) request which is sent by a client based on an Internet Protocol (IP) address of the server, wherein the UDP request includes identification information of a video to be played;
an acquisition module, configured to acquire the video to be played according to the identification information of the video to be played;
an encapsulation module, configured to encapsulate the video to be played from a key frame of the video to obtain a UDP packet; and
a first sending module, configured to send the UDP packet to the client at a first transmission rate, so that the client, after receiving the UDP packet, decapsulates the UDP packet to obtain the video to be played, and displays a first image frame of the video to be played, wherein the first transmission rate is the maximum transmission rate determined according to a network bandwidth.

Optionally, the encapsulation module is specifically configured to detect whether amount of data of the video to be played is greater than a preset data amount threshold; when the amount of data of the video to be played is greater than the preset data amount threshold, encapsulate the video to be played according to the key frame of the video included in the video to be played and the preset data amount threshold to obtain the UDP packet; and when the amount of data of the video to be played is not greater than the preset data amount threshold, encapsulate the video to be played from a first key frame of the video to obtain UDP packet.

Optionally, the apparatus further includes:
a first detection module, configured to detect whether there is a congestion in the network during a course of sending the UDP packet to the client;
an adjustment module, configured to adjust a transmission rate at which the UDP packet is sent to the client by using a congestion control algorithm when a detection result from the first detection module is there is a congestion in the network during the course of sending the UDP packet to the client; and
a second sending module, configured to send the UDP packet to the client at an adjusted transmission rate.

The embodiment of present disclosure further provides an apparatus for displaying a video image, which is applied to the client, and includes:
a third sending module, configured to send a User Datagram Protocol (UDP) request to a server based on an Internet Protocol (IP) address of the server, wherein the UDP request includes identification information of a video to be played;
a second receiving module, configured to receive a UDP packet sent by the server, wherein the UDP packet is obtained by the server by acquiring the video to be played according to the identification information of the video to be played after receiving the UDP request, and encapsulating the video to be played from a key frame of the video;
a decapsulation module, configured to decapsulate the UDP packet to obtain the video to be played; and
a display module, configured to display a first image frame of the video to be played.

Optionally, the decapsulation module includes:
an unpacking sub-module, configured to unpack the UDP packet according to a preset streaming format;
a detection sub-module, configured to detect codec information included in the UDP packet unpacked; and
a decoding sub-module, configured to decode the UDP packet unpacked according to the codec information to obtain the video to be played.

Optionally, the detection sub-module is specifically configured to detect whether the UDP packet unpacked includes the codec information according to a preset detection duration and preset detection data amount; and when the UDP packet unpacked includes the codec information, obtain the codec information.

Optionally, the apparatus further includes:
a second detection module, configured to detect whether the UDP packet sent by the server is received within a preset duration after the UDP request is sent; and
a fourth sending module, configured to resend the UDP request to the server based on the IP address of the server when a detection result from the second detection module is the UDP packet sent by the server is not received within the preset duration after the UDP request is sent.

The embodiment of the present disclosure also provides an electronic device, which includes a processor, a communication interface, a memory and a communication bus, wherein the processor, the communication interface and the memory communicate with each other via the communication bus;
the memory is configured to store a computer program; and
the processor is configured to implement any of above-mentioned methods for displaying the video image when executing the program stored on the memory.

The embodiment of the present disclosure also provides a computer-readable storage medium having a computer program stored thereon, which when executed by a processor, causes the processor to implement any of above-mentioned methods for displaying the video image.

The embodiment of the present disclosure also provides a computer program product containing instructions, which when runs on a computer, causes the computer to implement any of above-mentioned methods for displaying the video image.

The advantages of the embodiments of the present disclosure are as follows:
according to the technical solutions provided in the embodiments of the present disclosure, when the client directly sends the UDP request to the server based on the IP address of the server, that is, it is an IP direct connection between the client and the server, the client directly sends the UDP request according to the IP address of the server, thus avoiding a process of domain name resolution and saving the time consumed in the domain name resolution. In addition, during a data transmission, the server directly sends the UDP packet to the client at the first transmission rate, i.e. the maximum transmission rate, which reduces the time consumed in the UDP packet transmission. The IP direct connection between the client and the server, and sending of the UDP packet at the maximum transmission rate by the server allow the server to receive the UDP request earlier and to send the UDP packet to the client quickly, which effectively reduces the time consumed in the UDP packet transmission, enables the client to receive the UDP packet earlier, reduces the time required from initiating the request to displaying the first image frame of the video, and improves a display speed of the first image frame of the video.

Of course, an implementation of any product or method of the present disclosure is not necessarily to achieve all advantages mentioned above at the same time.

BRIEF DESCRIPTION OF THE DRAWINGS

In order to explain technical solutions of the embodiments of the present disclosure and the prior art more clearly, the drawings required in the embodiments and the prior art will be introduced in the following briefly. It is apparent that the drawings in the following description are only some embodiments of the present disclosure, for those of ordinary skill in the art, other drawings can also be obtained according to these drawings without any creative efforts.

DETAILED DESCRIPTION

The technical solutions of the embodiments of the present disclosure will be clearly and fully described below with reference to the drawings of the embodiments of the present disclosure. It is apparent that the embodiments described are only a part rather than all of the embodiments of the present disclosure. All other embodiments obtained based on the embodiments of the present disclosure, by those skilled in the art without creative efforts shall fall within the protection scope of the present disclosure.

At present, during displaying the first image frame of the video, the client initiates a TCP request using the complete video address with the domain name, and determines the corresponding server according to the domain name carried in the TCP request. The TCP connection between the server and the client is established via a three-way handshake. After the TCP connection is established, the server acquires the video data and sends the video data to the client in a slow-start manner. That is, the video data is first sent to the client at a low transmission rate, and then the transmission rate is gradually increased. Since both the domain name resolution and the video data transmission take a lot of time, it takes a long time for the client to receive the video data sent by the server, which leads to a slower displaying of the first image frame of the video. That is, it takes a long time from initiating the request by the client to analyzing to parsing to obtain the first frame of the video and displaying.

In order to solve the problem of slow displaying of the first image frame of the video mentioned above, the embodiment of the present disclosure provides a method for displaying a video image. The method can be applied to any electronic device, which can be an electronic device corresponding to the server or an electronic device corresponding to the client. The server receives a UDP request which is sent by the client based on the IP address of the server, herein the UDP request includes identification information of the video to be played. The video to be played is acquired according to the identification information of the video to be played. The video to be played is encapsulated from a key frame of the video to obtain a UDP packet. The UDP packet is sent to the client at a first transmission rate, so that the client, after receiving the UDP packet, decapsulates the UDP packet to obtain the video to be played and displays a first image frame of the video to be played, herein the first transmission rate is the maximum transmission rate determined according to a network bandwidth.

According to the method provided in the embodiment of the present disclosure, when the client directly sends the UDP request to the server based on the IP address of the server, that is, it is an IP direct connection between the client and the server, the client directly sends the UDP request according to the IP address of the server, thus avoiding a process of domain name resolution and saving the time consumed in the domain name resolution. In addition, during a data transmission, the server directly sends the UDP packet to the client at the first transmission rate, i.e. the maximum transmission rate, which reduces the time consumed in the UDP packet transmission. The IP direct connection between the client and the server, and sending of the UDP packet at the maximum transmission rate by the server allow the server to receive the UDP request earlier and to send the UDP packet to the client quickly, which effectively reduces the time consumed in the UDP packet transmission, enables the client to receive the UDP packet earlier, reduces the time required from initiating the request to displaying the first image frame of the video, and improves a display speed of the first image frame of the video.

In the following, the method for displaying the video image provided in the embodiment of the present disclosure will be described by means of specific embodiments.

Figure 1:
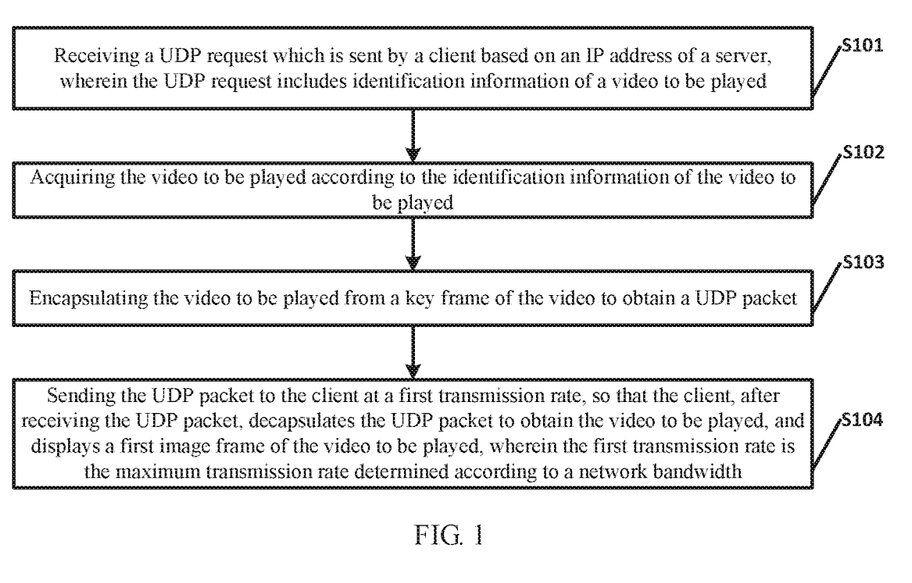
FIG. 1 is a first schematic flowchart of a method for displaying a video image provided in an embodiment of the present disclosure.

As shown in FIG. 1, it is a first schematic flowchart of a method for displaying a video image provided in an embodiment of the present disclosure. The method is applied to a server, and specifically comprises the following steps.

Step S101, receiving a UDP request which is sent by a client based on an IP address of a server, wherein the UDP request includes identification information of a video to be played.

In this step, the client sends a UDP request to the server based on a UDP transmission protocol and according to the IP address of the server, and the UDP request may include the identification information of the video to be played. The server receives the UDP request sent by the client. Among them, it is an IP direct connection between the client and the server.

With regard to the identification information of the video to be played included in the UDP request mentioned above, in one embodiment, the identification information may be address information of the video to be played. In another embodiment, the identification information may be an identification corresponding to the video to be played. For example, if the video to be played is a video that is being broadcast live in a live room that the user chooses to watch on the client, the identification information of the video may be a live room number corresponding to the live room. Herein, the identification information of the video to be played included in the UDP request is not specifically limited.

In the embodiment of the present disclosure, in order to improve the security of a data transmission, the UDP request may also include a handshake packet. After the UDP request is sent by the client, a connection may be quickly established in an application layer according to the handshake packet in the UDP request, so that the server may exchange data with the client only after confirming that the client is legal.

Compared with a TCP connection establishment process in a transport layer in the prior art, a connection establishment process in the application layer significantly reduces the time consumed in the connection establishment. Specifically, the time spent from a sending side sending data to the sending side receiving an acknowledgement message fed back by the receiving side is one delay, which is denoted as 1 RTT (Round-Trip Time). Compared with the TCP connection established via the three-way handshake between the client and the server in the prior art, where the TCP connection establishment of takes 1.5 RTT, the connection establishment in the embodiment of the present disclosure takes 0.5 RTT. In contrast, 1.5 RTT−0.5 RTT=1 RTT, 1 RTT is saved and the time consumed in the connection establishment is significantly reduced. In addition, in the embodiment of the present disclosure, the data transmission between the client and the server is based on the UDP transmission protocol, therefore, the connection establishment in the transport layer is not required, and the time consumed in which is 0 RTT.

Step S102, acquiring the video to be played according to the identification information of the video to be played.

In this step, after receiving the UDP request mentioned above, the server may acquire the video to be played according to the identification information of the video to be played included in the UDP request.

For example, in a case where the identification information of the video to be played is the address information of the video to be played, the server may read, after receiving the UDP request, the live streaming data corresponding to the address information according to the address information included in the UDP request to obtain the video to be played.

For another example, in a case where the identification information of the video to be played is the live room number corresponding to the live room, the server may obtain, after receiving the UDP request, the live streaming data corresponding to the live room number according to the live room number included in the UDP request to obtain the video to be played.

Step S103, encapsulating the video to be played from a key frame of the video to obtain a UDP packet.

In this step, the server may determine the key frame of the video included in the video to be played, encode the video to be played from the key frame of the video, and pack encoded video to be played to obtain the UDP packet. The video to be played includes at least one key frame of the video. Herein, the methods for encoding and packing the video to be played are not specifically limited.

The key frame of the video mentioned above may be a video frame where a key action in movement changes of a character or an object in the video to be played is located. For example, in a well-known compression encoding method, video frames are divided into I frames, P frames and B frames. The server may take I frames in the video to be played as the key frame of the video mentioned above. Since P frames and B frames do not include a complete video image in the corresponding video frame, decoding operations can only be carried out according to I frames. In contrast, I frames include a complete video image in the corresponding video frame, and can be directly decoded to get the complete video image, that is, I frames can be directly displayed as video images after decoding. Therefore, by encapsulating the video to be played from the key frame of the video, that is, the I frame of the video to be played, the first image frame is enabled to be a complete video image after the UDP packet is decapsulated, which is then displayed. As a result, the time consumed in decoding of the video and the time required from initiating the request to displaying the video image are effectively reduced, and the display speed of the first image frame of the video is improved.

Step S104, sending the UDP packet to the client at a first transmission rate, so that the client, after receiving the UDP packet, decapsulates the UDP packet received to obtain the video to be played and displays a first image frame of the video to be played. Herein, the first transmission rate is the maximum transmission rate determined according to the network bandwidth.

In this step, the server can send the UDP packet to the client according to the IP address of the client at the first transmission rate, that is, the maximum transmission rate. The client receives the UDP packet, decapsulates the UDP packet received to obtain the video to be played, and displays the first image frame of the video to be played. Herein, the first transmission rate is the maximum transmission rate determined according to the network bandwidth.

In one embodiment, the server can select the maximum transmission rate to send the UDP packet to the client according to the current network bandwidth. For example, the current network bandwidth is between 500 bit per second (denoted as bit/s) and 1000 bit/s, and the server can send the UDP packet to the client at 1000 bit/s.

To sum up, according to the method provided in the embodiments of the present disclosure, when the client directly sends the UDP request to the server based on the IP address of the server, that is, when it is an IP direct connection between the client and the server, the client directly sends the UDP request according to the IP address of the server, thus avoiding a process of domain name resolution and saving the time consumed in domain name resolution. In addition, during the data transmission, the server directly sends the UDP packet to the client at the first transmission rate, that is, the maximum transmission rate, which reduces the time consumed in the UDP packet transmission. The IP direct connection between the client and the server, and sending of the UDP packet at the maximum transmission rate by the server allow the server to receive the UDP request earlier and to send the UDP packet to the client quickly, which effectively reduces the time consumed in UDP packet transmission, enables the client to receive the UDP packet earlier, reduces the time required from initiating the request to displaying the first image frame of the video, and improves the display speed of the first image frame of the video.

In one alternative embodiment, above-mentioned step S103, where encapsulating the video to be played from a key frame of the video to obtain a UDP packet, specifically includes the following steps.

Step S1031, detecting whether amount of data of the video to be played is greater than a preset data amount threshold. If the amount of data of the video to be played is greater than the preset data amount threshold, step S1032 is executed, otherwise, step S1033 is executed.

In this step, the server may compare the amount of data of the video to be played with the preset data amount threshold to determine whether the amount of data of the video to be played is greater than the preset data amount threshold. Herein, the preset data amount threshold may be determined according to data volume of a subpacket in the network layer, and may also be determined according to actual requirements. Herein, the preset data amount threshold is not specifically limited.

Step S1032, encapsulating the video to be played according to the key frame of the video included in the video to be played and the preset data amount threshold to obtain the UDP packet.

In this step, when the amount of data of the video to be played is greater than the preset data amount threshold, if the video frames included in the video to be played are encapsulated into one UDP packet, the UDP packet may required to be divided into subpackets in the network layer. Therefore, the server can encapsulate the video to be played according to the key frame of the video included in the video to be played and the preset data amount threshold to obtain UDP packets.

In one embodiment, when the server encapsulates the video to be played according to the key frame of the video included in the video to be played and the preset data amount threshold, the first frame of each UDP packet may be enabled to be the key frame of the video, so that it is convenient for the client to decapsulate each UDP packet.

Following description is given by taking the preset data amount threshold of 1500 bytes as an example. Herein the amount of data of the video to be played is assumed to be 15000 bytes, wherein 15000>1500. When the server encapsulates the video to be played, it can encapsulate the video to be played according to the key frame of the video included in the video to be played and the preset data amount threshold. For example, when encapsulating the first 1500 bytes of video data, if the first key frame of the video in the video data is the $1^{st}$ frame and the last key frame of the video is the $1490^{th}$ frame, the server may encode all video frames from the $1^{st}$ frame to the $1489^{th}$ frame, and pack the encoded video data to obtain the UDP packet.

After that, when encapsulating frames from the $1490^{th}$ frame to the $2990^{th}$ frame, if the last key frame of the video is the $2990^{th}$ frame, the server may encode and pack all video frames from the $1490^{th}$ frame to the $2989^{th}$ frame to obtain the UDP packet, and so on, until encapsulating of the video to be played is completed, and a plurality of UDP packets corresponding to the video to be played are obtained.

Step S1033, encapsulating the video to be played from the first key frame of the video to obtain the UDP packet.

In this step, when the amount of data of the video to be played is not greater than the preset data amount threshold, that is, when the amount of data of the video to be played is less than or equal to the preset data amount threshold, even if the video frames included in the video to be played are encapsulated into one UDP packet, the UDP packet will not be divided into subpackets in the network layer. Therefore, the server can encapsulate the video to be played directly from the first key frame of the video to obtain the UDP packet.

The preset data amount threshold of 1500 bytes is still taken as an example, if the amount of data of the video to be played is assumed to be 1000 bytes, the server can encapsulate the video to be played directly from the first key frame of the video of the video to be played, and obtain the UDP packet corresponding to the video to be played.

By executing the steps mentioned above, in addition to encapsulating the video to be played from the key frame of the video to reduce the time required for decoding the UDP packet and displaying the video image by the client, the server, when encapsulating the video to be played, encapsulates the video to be played according to the preset data amount threshold, which can effectively control the size of the encapsulated UDP packet and reduce the probability of the UDP packet being divided into subpacks in the network layer. As a result, the time required by the server to send the UDP packet to the client is reduced, so that the client can receive the UDP packet earlier, the time from initiating the request to displaying the first image frame of video is also reduced, and the display speed of the first image frame of video is improved.

Figure 2:
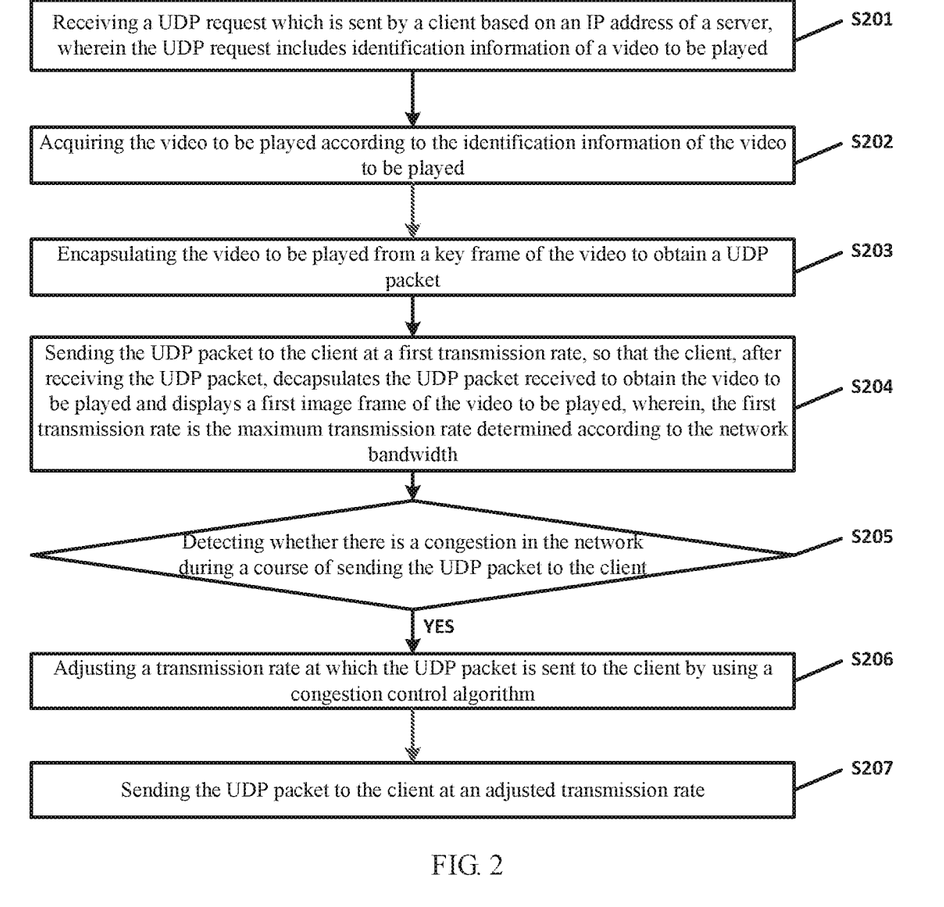
FIG. 2 is a second schematic flowchart of a method for displaying a video image provided in an embodiment of the present disclosure.

In one alternative embodiment, according to the method for displaying the video image shown in FIG. 1, another method for displaying the video image is also provided. As shown in FIG. 2, it is a second schematic flowchart of a method for displaying a video image provided in an embodiment of the present disclosure. The method is applied to the server, and specifically includes the following steps.

Step S201, receiving a UDP request which is sent by a client based on an IP address of a server, wherein the UDP request includes identification information of a video to be played.

Step S202, acquiring the video to be played according to the identification information of the video to be played.

Step S203, encapsulating the video to be played from a key frame of the video to obtain a UDP packet.

Step S204, sending the UDP packet to the client at a first transmission rate, so that the client, after receiving the UDP packet, decapsulates the UDP packet received to obtain the video to be played and displays a first image frame of the video to be played. Herein, the first transmission rate is the maximum transmission rate determined according to the network bandwidth.

The steps S201-S204 are respectively the same as the steps S101-S104 mentioned above.

Step S205, detecting whether there is a congestion in a network during a course of sending the UDP packet to the client. If there is a congestion in the network, step S206 is executed.

In this step, during the course of sending of the UDP packet from the server to the client, the server can detect in real time whether there is a congestion in current network. For example, the server can detect in real time whether the network transmission performance of the current network is declining, such as whether the UDP packet is lost, whether the data transmission delay is increasing or whether the throughput is decreasing, etc.

Step S206, adjusting a transmission rate at which the UDP packet is sent to the client by using a congestion control algorithm.

In this step, when there is a congestion in the network, the server can adjust a current transmission rate by using the congestion control algorithm, that is, to reduce the current transmission rate.

For example, the server sends the UDP packet to the client at the first transmission rate. At a certain moment, the server detects that there is a congestion in the network. Then the server can adjust the first transmission rate to a second transmission rate at this point. Herein the first transmission rate is greater than the second transmission rate.

In the implementation of the present disclosure, the congestion control algorithm mentioned above includes, but is not limited to, the Vegas algorithm, the Reno algorithm, and the Bottleneck Bandwidth and RTT (BBR) algorithm.

Step S207, sending the UDP packet to the client at an adjusted transmission rate.

In this step, the server can send the UDP packet to the client at the adjusted transmission rate. For example, the server may send the UDP packet to the client at the second transmission rate after adjusting the first transmission rate to the second transmission rate.

In one alternative embodiment, when there is no congestion in the network and the current transmission rate is the maximum transmission rate determined according to the network bandwidth, the server may continue to send the UDP packet to the client at the current transmission rate. For example, the current transmission rate is the first transmission rate mentioned above, and the server may send the UDP packet to the client still at the first transmission rate when there is no congestion in the network.

In another alternative embodiment, when there is no congestion in the network and the current transmission rate is not the maximum transmission rate determined according to the network bandwidth, the server may adjust the current transmission rate, that is, to increase the current transmission rate, and send the UDP packet to the client at the adjusted transmission rate. For example, the current transmission rate is the second transmission rate mentioned above, and when there is no congestion in the network, the server may adjust the second transmission rate to a third transmission rate and send the UDP packet to the client at the third transmission rate. Herein the third transmission rate is greater than the second transmission rate but not greater than the first transmission rate mentioned above.

According to the method for displaying the video image shown in FIG. 2, the server detects in real time whether there is a congestion in the network, so as to adjust the current transmission rate in time when a congestion occurs, which effectively reduces the influence of the congestion in the network on the UDP packet transmission, and reduces the time consumed in the UDP packet transmission when there is a congestion in the network. As a result, the efficiency of the UDP packet transmission is improved, which enables the client to receive the UDP packet earlier, thus reducing the time required from initiating the request to displaying the first image frame of the video and improving the display speed of the first image frame of the video.

Figure 3:
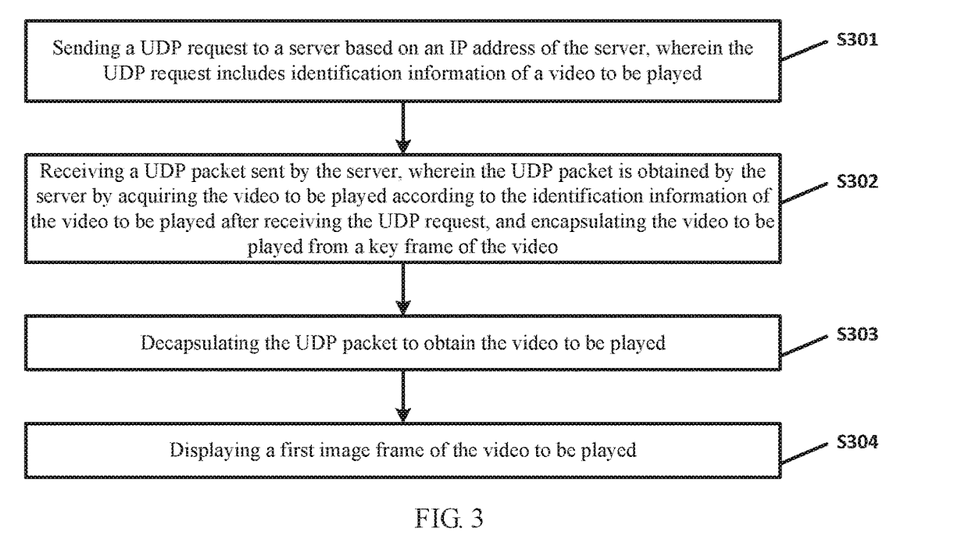
FIG. 3 is a third schematic flowchart of a method for displaying a video image provided in an embodiment of the present disclosure.

Based on the same inventive concept, according to the method for displaying the video image in the embodiment of the disclosure mentioned above, another method for displaying the video image is provided. As shown in FIG. 3, it is a third schematic flowchart of a method for displaying a video image provided in an embodiment of the present disclosure. The method is applied to the client, and specifically includes the following steps.

Step S301, sending a UDP request to a server based on an IP address of the server, wherein the UDP request includes identification information of a video to be played.

In this step, the client may send the UDP request to the server according to the IP address of the server and the UDP transmission protocol. Herein, the UDP request includes the identification information of the video to be played.

Step S302, receiving a UDP packet sent by the server, wherein the UDP packet is obtained by the server by acquiring the video to be played according to the identification information of the video to be played after receiving the UDP request, and encapsulating the video to be played from a key frame of the video.

In this step, after receiving the UDP request sent by the client, the server may acquire the video to be played according to the identification information of the video to be played included in the UDP request received, and encapsulate the video to be played from the key frame of the video to obtain the UDP packet. The server may send the UDP packet to the client at a first transmission rate, that is, the maximum transmission rate determined according to the network bandwidth. The client receives the UDP packet sent at the first transmission rate by the server.

Step S303, decapsulating the UDP packet to obtain the video to be played.

In this step, the client may decapsulate the UDP packet received, that is, unpack the UDP packet received and decode the UDP packet unpacked to obtain the video to be played.

Step S304, displaying a first image frame of the video to be played.

In this step, the client can expand the first frame of the video to be played into a video image and display the video image.

According to the method for displaying the video image shown in FIG. 3, when the client directly sends the UDP request to the server based on the IP address of the server, that is, it is an IP direct connection between the client and the server, the client directly sends the UDP request according to the IP address of the server, thus avoiding a process of domain name resolution and saving the time consumed in the domain name resolution. In addition, during a data transmission, the server directly sends the UDP packet to the client at the first transmission rate, i.e. the maximum transmission rate, which reduces the time consumed in the UDP packet transmission. The IP direct connection between the client and the server, and sending of the UDP packet at the maximum transmission rate by the server allow the server to receive the UDP request earlier and to send the UDP packet to the client quickly, which effectively reduces the time consumed in the UDP packet transmission, enables the client to receive the UDP packet earlier, reduces the time required from initiating the request to displaying the first image frame of the video, and improves a display speed of the first image frame of the video.

In an alternative embodiment, above-mentioned step S303, where decapsulating the UDP packet to obtain the video to be played, specifically includes the following steps.

Step S3031, unpacking the UDP packet according to a preset streaming format.

In this step, the client may unpack the UDP packet received according to the preset streaming format. For example, the preset streaming format is a Transport Stream (TS) format, and the client may unpack the UDP packet received according to the TS format after receiving the UDP packet.

Step S3032, detecting codec information included in the UDP packet unpacked.

In this step, the client may detect whether the UDP packet unpacked includes codec information according to the UDP packet unpacked. When the codec information is included therein, the client may obtain the codec information.

In the embodiment of the present disclosure, the codec information mentioned above may at least include one of encoding information and decoding information. In addition, the codec information may also include other information such as a video format and a code rate.

In an alternative embodiment, above-mentioned step S3032, where detecting codec information included in the UDP packet unpacked, may specifically include the following steps.

Step S3032A, detecting whether the UDP packet unpacked includes the codec information according to a preset detection duration and preset detection data amount. If the UDP packet unpacked includes the codec information, step S3032B is executed.

In this step, the client may select the video data with the preset detection data amount from the UDP packet unpacked according to the preset detection duration, as the video data to be detected. Detecting whether the video data to be detected includes the codec information. The codec information is generally stored in a preset field of video data, and the client may detect whether the preset field is included in the video data to be detected, thus determining whether the codec information is included in the video data to be detected.

If the codec information is included in the video data to be detected, the client may determine that the codec information is included in the UDP packet unpacked. If the codec information is not included in the video data to be detected, the client may determine that the codec information is not included in the UDP packet unpacked.

In the embodiment of the present disclosure, the preset detection duration and the preset detection data amount may be determined according to the size of the UDP packet unpacked. Herein, the preset detection duration and the preset detection data amount are not specifically limited.

Step S3032B, obtaining the codec information.

In this step, when it is determined that the UDP packet unpacked includes the codec information, the client may obtain the codec information from the UDP packet unpacked. That is, obtain the codec information from the video data to be detected.

In an alternative embodiment, when it is determined that the UDP packet unpacked does not include the codec information, the client may adopt different ways of implementation according to specific situations. In one embodiment, when it is determined that the UDP packet unpacked does not include the codec information, the client may display a first prompt message, such as video loading failure, video error, etc. In another embodiment, when it is determined that the UDP packet unpacked does not include the codec information, the client may resend the UDP request to the server, return to perform above-mentioned steps of receiving the UDP data packet sent by the server, and display a second prompt message in the client, such as video being re-acquired, video being reloaded, etc.

In the embodiment of the disclosure, the client detects whether the UDP packet unpacked includes the codec information according to the preset detection duration and the preset detection data amount, so that the client does not need to detect the codec information of the whole UDP packet from a header of the UDP packet unpacked, thus reducing the data amount to be detected and shortening the detection duration for the codec information. As a result, the time consumed in the decoding operation and the time required from initiating the request to displaying the first image frame of the video are reduced, and the display speed of the first image frame of the video.

Step S3033, decoding the UDP packet unpacked according to the codec information to obtain the video to be played.

In this step, the client may decode the UDP packet unpacked according to the codec information included in the UDP packet unpacked, to obtain the video to be played.

In the embodiment of the present disclosure, the client unpacks the UDP packet received directly according to the preset streaming format, which saves the time required for detecting the streaming format by the client. As a result, the time consumed in detecting the streaming format is saved, and the time for obtaining the video to be played and the time required from initiating the request to displaying the first image frame of the video are reduced, and the display speed of the first image frame of the video is improved.

Figure 4:
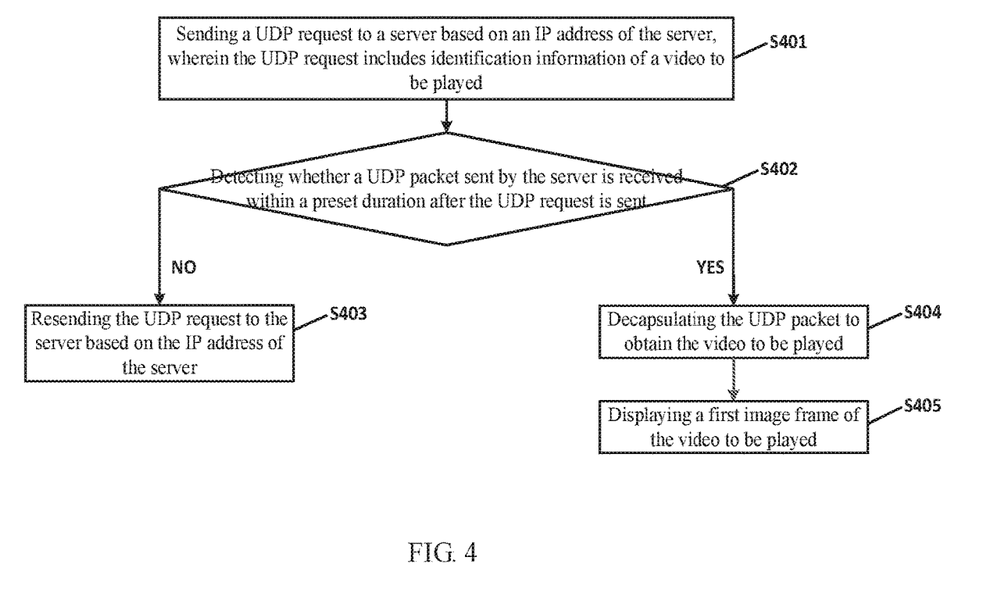
FIG. 4 is a fourth schematic flowchart of a method for displaying a video image provided in an embodiment of the present disclosure.

In an alternative embodiment, according to the method for displaying the video image shown in FIG. 3, another method for displaying the video image is provided. As shown in FIG. 4, it is a fourth schematic flowchart of a method for displaying a video image provided in an embodiment of the present disclosure. The method is applied to the client, and specifically includes the following steps.

Step S401, sending a UDP request to a server based on an IP address of the server, wherein the UDP request includes identification information of a video to be played.

The step S401 is the same as above-mentioned step S301.

Step S402, detecting whether a UDP packet sent by the server is received within a preset duration after the UDP request is sent. If the UDP packet sent by the server is not received within the preset duration after the UDP request is sent, step S403 is executed. If the UDP packet sent by the server is received within the preset duration after the UDP request is sent, step S404 is executed.

In this step, the client may detect in real time whether the UDP packet sent by the server is received within the preset duration after the client sends the UDP request to the server. In one embodiment, the client may start a preset timer after sending the UDP request, and when a counting duration of the timer reaches the preset duration, if the client still has not received the UDP packet sent by the server, step S403 may be executed.

In the embodiment of the present disclosure, the preset duration may be determined according to a communication delay between the client and the server, the network bandwidth, etc. Herein, the preset duration is not specifically limited.

Step S403: resending the UDP request to the server based on the IP address of the server.

In this step, if the client does not receive the UDP packet sent by the server, the client may resend the UDP request to the server according to the IP address of the server and based on the UDP transmission protocol.

Step S404, decapsulating the UDP packet to obtain the video to be played.

Step S405, displaying a first image frame of the video to be played.

The steps S404-S405 are the same as above-mentioned steps S303-S304.

According to the method for displaying the video image shown in FIG. 4, since the data interaction between the client and the server is based on UDP transmission protocol, after the client sends the UDP request to the server, the server will not feed back a corresponding Acknowledgement (ACK) message after receiving the UDP request, which effectively reduces the time consumed in data interaction. In order to improve the reliability of the data interaction, the client may resend the UDP request to the server in a condition that it does not receive the UDP packet sent by the server within a preset duration.

Figure 5:
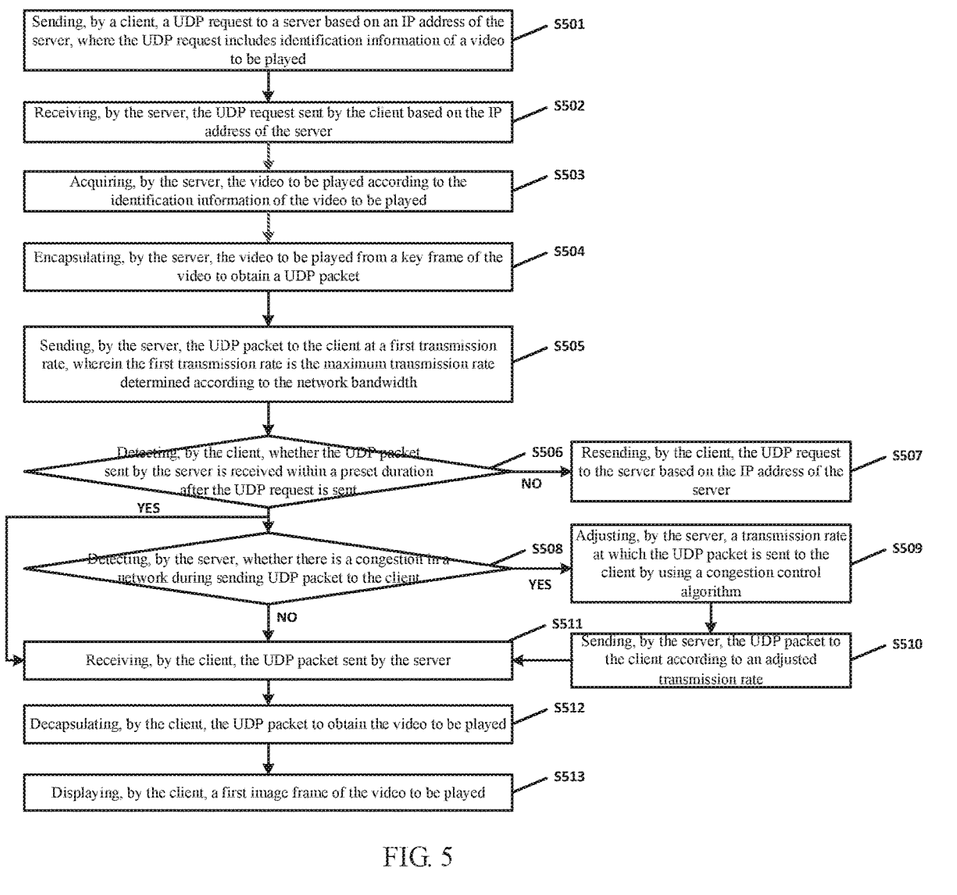
FIG. 5 is a fifth schematic flowchart of a method for displaying a video image provided in an embodiment of the present disclosure.

For the convenience of understanding, the embodiment of the present disclosure also provides another schematic flowchart of a method for displaying a video image. As shown in FIG. 5, it is a fifth schematic flowchart of a method for displaying a video image provided in an embodiment of the present disclosure. The method includes the following steps.

Step S501, sending, by a client, a UDP request to a server based on an IP address of the server, where the UDP request includes identification information of a video to be played. See above-mentioned step S301 for details.

Step S502, receiving, by the server, the UDP request sent by the client based on the IP address of the server.

Step S503, acquiring, by the server, the video to be played according to the identification information of the video to be played.

Step S504, encapsulating, by the server, the video to be played from a key frame of the video to obtain a UDP packet.

Step S505, sending, by the server, the UDP packet to the client at a first transmission rate, wherein the first transmission rate is the maximum transmission rate determined according to the network bandwidth.

The steps S502-S505 are the same as above-mentioned steps S101-S104, respectively.

Step S506, detecting, by the client, whether the UDP packet sent by the server is received within a preset duration after the UDP request is sent. If the UDP packet sent by the server is not received within the preset duration after the UDP request is sent, step S507 is executed. If the UDP packet sent by the server is received within the preset duration after the UDP request is sent, step S511 is executed.

Step S507, resending, by the client, the UDP request to the server based on the IP address of the server.

The steps S506-S507 are the same as above-mentioned steps S402-S403, respectively.

Step S508, detecting, by the server, whether there is a congestion in a network during a course of sending UDP packet to the client. If there is a congestion in the network, step S509 is executed. If there is not a congestion in the network, step S511 is executed.

In the embodiment of the present disclosure, an execution order of above-mentioned steps S505, S506 and S508 is not specifically limited.

Step S509, adjusting, by the server, a transmission rate at which the UDP packet is sent to the client by using a congestion control algorithm.

Step S510, sending, by the server, the UDP packet to the client according to an adjusted transmission rate.

The steps S508-S510 are the same as above-mentioned steps S205-S207, respectively.

Step S511, receiving, by the client, the UDP packet sent by the server.

Step S512, decapsulating, by the client, the UDP packet to obtain the video to be played.

Step S513, displaying, by the client, a first image frame of the video to be played.

The steps S511-S513 are the same as above-mentioned steps S302-S304, respectively.

Figure 6:
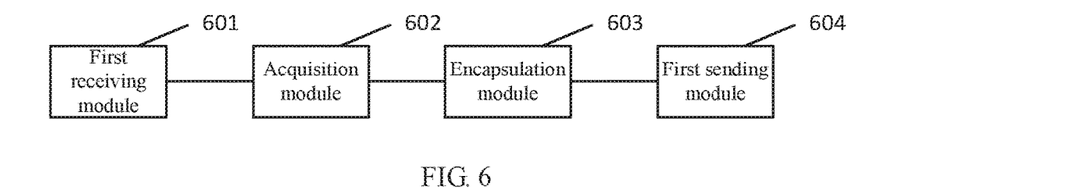
FIG. 6 is a first structural schematic diagram of an apparatus for displaying a video image provided in an embodiment of the present disclosure.

Based on the same inventive concept, the embodiment of the present disclosure also provides an apparatus for displaying a video image according to the method for displaying the video image provided in the embodiment of the present disclosure. As shown in FIG. 6, it is a first structural schematic diagram of an apparatus for displaying a video image provided in an embodiment of the present disclosure. The apparatus is applied to the server and specifically includes the following modules.

A first receiving module 601, configured to receive a UDP request which is sent by a client based on an IP address of a server, wherein the UDP request includes identification information of the video to be played.

An acquisition module 602, configured to acquire the video to be played according to the identification information of the video to be played.

An encapsulation module 603, configured to encapsulate the video to be played from a key frame of the video to obtain a UDP packet.

A first sending module 604, configured to send the UDP packet to the client at a first transmission rate, so that the client, after receiving the UDP packet, decapsulates the UDP packet received to obtain the video to be played and displays a first image frame of the video to be played, wherein the first transmission rate is the maximum transmission rate determined according to the network bandwidth.

Optionally, the encapsulation module 603 mentioned above may be specifically configured to detect whether amount of data of the video to be played is greater than a preset data amount threshold; encapsulate the video to be played according to the key frame of the video included in the video to be played and the preset data amount threshold to obtain the UDP packet when the amount of data of the video to be played is greater than the preset data amount threshold; and encapsulate the video to be played from the first key frame of the video to obtain the UDP packet when the amount of data of the video to be played is not greater than the preset data amount threshold.

Optionally, the apparatus for displaying the video image may further include the following modules.

A first detection module, configured to detect whether there is a congestion in a network during a course of sending the UDP packet to the client.

An adjustment module, configured to adjust a transmission rate of at which the UDP packet is sent to the client by using a congestion control algorithm when a detection result from the first detection module is there is a congestion in the network.

A second sending module, configured to send the UDP packet to the client at an adjusted transmission rate.

Figure 7:
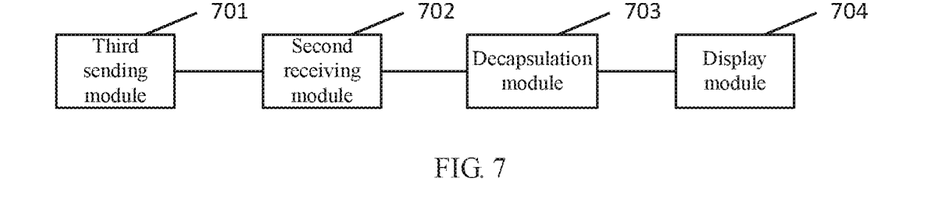
FIG. 7 is a second structural schematic diagram of an apparatus for displaying a video image provided in an embodiment of the present disclosure.

Based on the same inventive concept, the embodiment of the disclosure also provides an apparatus for displaying a video image according to the method for displaying the video image provided in the embodiment of the disclosure. As shown in FIG. 7, it is a second structural schematic diagram of an apparatus for displaying a video image provided in an embodiment of the present disclosure. The apparatus is applied to the client and specifically includes the following modules.

A third sending module 701, configured to send a UDP request to a server based on an IP address of the server, wherein the UDP request includes identification information of a video to be played.

A second receiving module 702, configured to receive a UDP packet sent by the server, wherein the UDP packet is obtained by the server by acquiring the video to be played according to the identification information of the video to be played after receiving the UDP request, and encapsulating the video to be played from a key frame of the video.

A decapsulation module 703, configured to decapsulate the UDP packet to obtain the video to be played.

A display module 704, configured to display a first image frame of the video to be played.

Optionally, the decapsulation module 703 may include the following modules.

An unpacking sub-module, configured to unpack the UDP packet according to a preset streaming format.

A detection sub-module, configured to detect codec information included in the UDP packet unpacked.

A decoding sub-module, configured to decode the UDP packet unpacked according to the codec information to obtain the video to be played.

Optionally, the detection sub-module mentioned above may be specifically configured to detect whether the UDP packet unpacked includes the codec information according to a preset detection duration and preset detection data amount; and obtain the codec information when the UDP packet unpacked includes the codec information.

Optionally, the apparatus for displaying the video image may further include the following modules.

A second detection module, configured to detect whether a UDP packet sent by the server is received within a preset duration after the UDP request is sent.

A fourth sending module, configured to resend the UDP request to the server based on the IP address of the server when a detection result from the second detection module is the UDP packet sent by the server is not received within the preset duration after the UDP request is sent.

According to the apparatus provided in the embodiment of the present disclosure, when the client directly sends the UDP request to the server based on the IP address of the server, that is, it is an IP direct connection between the client and the server, the client directly sends the UDP request according to the IP address of the server, thus avoiding a process of domain name resolution and saving the time consumed in the domain name resolution. In addition, during a data transmission, the server directly sends the UDP packet to the client at the first transmission rate, i.e. the maximum transmission rate, which reduces the time consumed in the UDP packet transmission. The IP direct connection between the client and the server, and sending of the UDP packet at the maximum transmission rate by the server allow the server to receive the UDP request earlier and to send the UDP packet to the client quickly, which effectively reduces the time consumed in the UDP packet transmission, enables the client to receive the UDP packet earlier, reduces the time required from initiating the request to displaying the first image frame of the video, and improves the display speed of the first image frame of the video.

Figure 8:
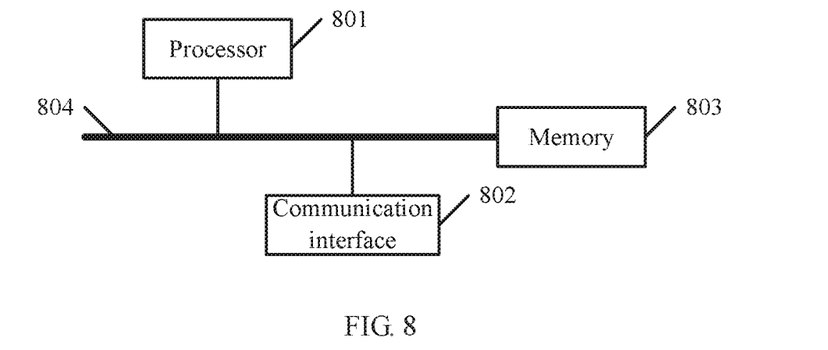
FIG. 8 is a first structural schematic diagram of an electronic device provided in an embodiment of the present disclosure.

Based on the same inventive concept, according to the method for displaying the video image provided in above embodiments of the present disclosure, the embodiment of the present disclosure also provides an electronic device. The electronic device can be a server. As shown in FIG. 8, it includes a processor 801, a communication interface 802, a memory 803 and a communication bus 804, wherein the processor 801, the communication interface 802 and the memory 803 communicate with each other via the communication bus 804;

the memory 803 is configured to store computer programs;

the processor 801 is configured to implement, when executing the programs stored in the memory 803, the following steps:

receiving a UDP request sent by a client based on an IP address of a server, wherein the UDP request includes identification information of a video to be played;

acquiring the video to be played according to the identification information of the video to be played;

encapsulating the video to be played from a key frame of the video to obtain a UDP packet;

sending the UDP packet to the client at a first transmission rate, so that the client, after receiving the UDP packets, decapsulates the UDP packet to obtain the video to be played and displays a first image frame of the video to be played, wherein the first transmission rate is the maximum transmission rate determined according to the network bandwidth.

Figure 9:
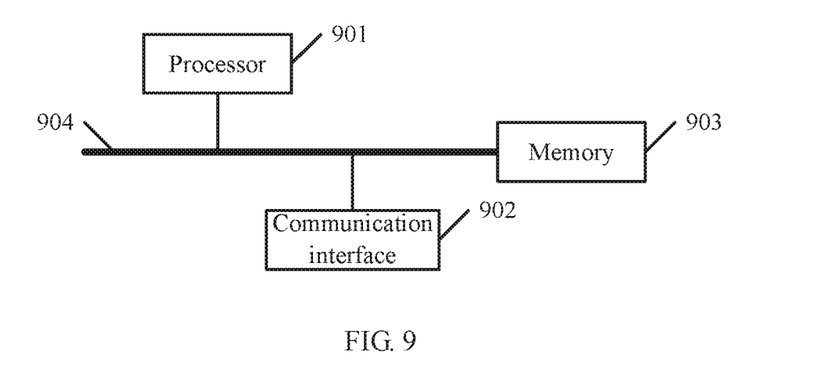
FIG. 9 is a second structural schematic diagram of an electronic device provided in an embodiment of the present disclosure.

Based on the same inventive concept, according to the method for displaying the video image provided in above embodiments of the present disclosure, the embodiment of the present disclosure also provides an electronic device. The electronic device can be a client. As shown in FIG. 9, it includes a processor 901, a communication interface 902, a memory 903 and a communication bus 904, wherein the processor 901, the communication interface 902 and the memory 903 communicate with each other via the communication bus 904;

the memory 903 is configured to store computer programs;

the processor 901 is configured to implement, when executing the programs stored in the memory 903, the following steps:

sending a UDP request to a server based on an IP address of the server, wherein the UDP request includes identification information of a video to be played;

receiving a UDP packet sent by the server, wherein the UDP packet is obtained by the server by acquiring the video to be played according to the identification information of the video to be played after receiving the UDP request, and encapsulating the video to be played from a key frame of the video;

decapsulating the UDP packet to obtain the video to be played;

displaying a first image frame of the video to be played.

According to the electronic device provided in the embodiment of the present disclosure, when the client directly sends the UDP request to the server based on the IP address of the server, that is, it is an IP direct connection between the client and the server, the client directly sends the UDP request according to the IP address of the server, thus avoiding a process of domain name resolution and saving the time consumed in the domain name resolution. In addition, during a data transmission, the server directly sends the UDP packet to the client at the first transmission rate, i.e. the maximum transmission rate, which reduces the time consumed in the UDP packet transmission. The IP direct connection between the client and the server, and sending of the UDP packet at the maximum transmission rate by the server allow the server to receive the UDP request earlier and to send the UDP packet to the client quickly, which effectively reduces the time consumed in the UDP packet transmission, enables the client to receive the UDP packet earlier, reduces the time required from initiating the request to displaying the first image frame of the video, and improves a display speed of the first image frame of the video.

The communication bus mentioned in above electronic device can be Peripheral Component Interconnect (PCI) bus or Extended Industry Standard Architecture (EISA) bus, etc. The communication bus can be divided into an address bus, a data bus, a control bus, etc. For the convenience of illustrating, only one thick line in the figure is used for representing the bus, but it does not mean that there is only one bus or one type of bus.

The communication interface is used for communication between the electronic devices mentioned above and other devices.

The memory may include Random Access Memory (RAM) or Non-Volatile Memory (NVM), such as at least one disk memory. Optionally, the memory may also be at least one storage located away from the processor mentioned above.

The processor mentioned above may be a general-purpose processor, including a Central Processing Unit (CPU), a Network Processor (NP), etc., it may also be a Digital Signal Processing (DSP), an Application Specific Integrated Circuit (ASIC), a Field-Programmable Gate Array (FPGA) or other programmable logic devices, discrete gates or transistor logic devices, and discrete hardware components.

Based on the same inventive concept, according to the method for displaying the video image provided in above-mentioned embodiment of the present disclosure, the embodiment of the present disclosure also provides a computer-readable storage medium having a computer program stored thereon, which when executed by a processor, cause the processor to implement steps of any of above-mentioned methods for displaying the video image.

Based on the same inventive concept, according to the method for displaying the video image provided in above-mentioned embodiment of the present disclosure, the embodiment of the present disclosure also provides a computer program product containing instructions, which when run on a computer, causes the computer to implement any of the methods for displaying the video image in above-mentioned embodiments.

The above-mentioned embodiments may be implemented in whole or in part in software, hardware, firmware or any combination thereof. When implemented in software, it may be implemented in whole or in part in the form of a computer program product. The computer program product includes one or more computer instructions. When the computer program instructions are loaded and executed on a computer, all or part of the processes or functions described in the embodiments of the present disclosure are produced. The computer may be a general-purpose computer, a special-purpose computer, a computer network, or other programmable devices. The computer instructions may be stored on a computer-readable storage medium or transmitted from one computer-readable storage medium to another computer-readable storage medium. For example, the computer instructions may be transmitted from a website, computer, server or data center to another website, computer, server or data center via wired (such as coaxial cable, optical fiber, digital subscriber line (DSL)) or wireless (such as infrared, wireless, microwave, etc.) connections. The computer-readable storage medium may be any available medium that a computer can access or a data storage including one or more available media, such as integrated servers, data centers and the like. The available media may be magnetic media (e.g., floppy disk, hard disk, magnetic tape), optical media (e.g., DVD), or semiconductor media (e.g., Solid State Disk (SSD)), etc.

It should be noted that, relational terms herein, such as first and second, are merely used to distinguish one entity or operation from another entity or operation, and do not necessarily require or imply any such actual relationship or order between these entities or operations. Also, terms "comprised", "include" or any other variant thereof are intended to cover non-exclusive inclusion, so that a process, a method, an article or a device including a series of elements includes not only those elements, but also other elements not explicitly listed, or elements inherent to such process, method, article or device. Without further limitations, the elements defined by the sentence "includes/comprises a/an . . . " do not exclude the presence of other identical elements in the process, method, article or device including said element.

Respective embodiments in this specification are described in a relevant way, and the same and similar parts between respective embodiments can be referred to each other, and respective embodiments focused on the differences from other embodiments. In particular, for embodiments such as apparatuses, electronic devices, computer-readable storage media and computer program products, the descriptions of them are relatively simple since they are basically similar to the method embodiments, and the relevant parts can be referred to partial descriptions of the method embodiments.

The above descriptions are only preferred embodiments of the present disclosure, and are not intended to limit the scope of protection of the present disclosure. Any modification, equivalent replacement, improvement, etc. made within the spirit and principle of the present disclosure are fall within the protection scope of the present disclosure.

What is claimed is:

1. A method for displaying a video image, applied to a server and comprising:
   receiving a User Datagram Protocol (UDP) request which is sent by a client based on an Internet Protocol (IP) address of the server, wherein the UDP request comprises identification information of a video to be played;
   acquiring the video to be played according to the identification information of the video to be played;
   encapsulating the video to be played from a key frame of the video to obtain a UDP packet; and
   sending the UDP packet to the client at a first transmission rate, so that the client, after receiving the UDP packet, decapsulates the UDP packet to obtain the video to be played, and displays a first image frame of the video to be played, wherein the first transmission rate is the maximum transmission rate determined according to a network bandwidth.

2. The method according to claim 1, wherein a step of encapsulating the video to be played from a key frame of the video to obtain a UDP packet comprises:
   detecting whether amount of data of the video to be played is greater than a preset data amount threshold;
   when the amount of data of the video to be played is greater than the preset data amount threshold, encapsulating the video to be played according to the key frame of the video comprised in the video to be played and the preset data amount threshold to obtain the UDP packet; and
   when the amount of data of the video to be played is not greater than the preset data amount threshold, encapsulating the video to be played from a first key frame of the video to obtain the UDP packet.

3. The method according to claim 1, wherein the method further comprises:
   detecting whether there is a congestion in the network during a course of sending the UDP packet to the client;
   when there is a congestion in the network during the course of sending the UDP packet to the client, adjusting a transmission rate at which the UDP packet is sent to the client by using a congestion control algorithm; and sending the UDP packet to the client at an adjusted transmission rate.

4. A method for displaying a video image, applied to a client and comprising:

sending a User Datagram Protocol (UDP) request to a server based on an Internet Protocol (IP) address of the server, wherein the UDP request comprises identification information of a video to be played;

receiving a UDP packet sent by the server, wherein the UDP packet is obtained by the server by acquiring the video to be played according to the identification information of the video to be played after receiving the UDP request, and encapsulating the video to be played from a key frame of the video;

decapsulating the UDP packet to obtain the video to be played; and displaying a first image frame of the video to be played.

5. The method according to claim 4, wherein a step of decapsulating the UDP packet to obtain the video to be played comprises:

unpacking the UDP packet according to a preset streaming format;

detecting codec information comprised in the UDP packet unpacked; and decoding the UDP packet unpacked according to the codec information to obtain the video to be played.

6. The method according to claim 5, wherein a step of detecting codec information comprised in the UDP packet unpacked comprises:

detecting whether the UDP packet unpacked comprises the codec information according to a preset detection duration and preset detection data amount; and when the UDP packet unpacked comprises the codec information, obtaining the codec information.

7. The method according to claim 4, wherein the method further comprises:

detecting whether the UDP packet sent by the server is received within a preset duration after the UDP request is sent; and when the UDP packet sent by the server is not received within the preset duration after the UDP request is sent, resending the UDP request to the server based on the IP address of the server.

8. An electronic device comprising a processor, a communication interface, a memory and a communication bus, wherein the processor, the communication interface and the memory communicate with each other via the communication bus;

the memory is configured to store a computer program; and the processor is configured to implement the method of claim 1 when executing the program stored on the memory.

9. A non-transitory computer-readable storage medium having a computer program stored thereon, which when executed by a processor, causes the processor to implement the method of claim 1.

10. A computer program product, which when run on a computer, causes the computer to implement the method of claim 1.

11. An electronic device comprising a processor, a communication interface, a memory and a communication bus, wherein the processor, the communication interface and the memory communicate with each other via the communication bus;

the memory is configured to store a computer program; and the processor is configured to implement the method of claim 4 when executing the program stored on the memory.

12. A non-transitory computer-readable storage medium having a computer program stored thereon, which when executed by a processor, causes the processor to implement the method of claim 4.

13. A computer program product, which when run on a computer, causes the computer to implement the method of claim 4.

* * * * *